(12) United States Patent
Snell

(10) Patent No.: US 8,650,847 B2
(45) Date of Patent: Feb. 18, 2014

(54) NUT AND FRUIT HARVESTING APPARATUS, SYSTEMS AND METHODS

(76) Inventor: Lloyd D. Snell, Ames, IA (US)

( * ) Notice: Subject to any disclaimer, the term of this patent is extended or adjusted under 35 U.S.C. 154(b) by 613 days.

(21) Appl. No.: 12/871,459

(22) Filed: Aug. 30, 2010

(65) Prior Publication Data

US 2011/0047956 A1    Mar. 3, 2011

Related U.S. Application Data

(60) Provisional application No. 61/238,553, filed on Aug. 31, 2009.

(51) Int. Cl.
*A01D 46/00* (2006.01)
(52) U.S. Cl.
USPC .......................................................... 56/340.1
(58) Field of Classification Search
USPC ................................................ 56/328.1, 340.1
See application file for complete search history.

(56) References Cited

U.S. PATENT DOCUMENTS

| | | | |
|---|---|---|---|
| 3,221,567 A | 12/1965 | Brandt, Jr. | |
| 3,318,629 A | 5/1967 | Brandt, Jr. | |
| 3,335,556 A | 8/1967 | Edgemond, Jr. | |
| 3,509,702 A * | 5/1970 | Rickerd | 56/328.1 |
| 3,551,764 A * | 12/1970 | Evans | 318/116 |
| 3,594,999 A * | 7/1971 | Savage | 56/340.1 |
| 3,596,972 A | 8/1971 | Pool | |
| 3,964,244 A | 6/1976 | Vallicella | |
| 4,170,100 A | 10/1979 | Hood, Jr. et al. | |
| 4,194,347 A | 3/1980 | Peters | |
| 4,275,548 A | 6/1981 | Savage, Sr. | |
| 4,409,782 A | 10/1983 | Westergaard et al. | |
| 4,414,795 A | 11/1983 | Johnstone et al. | |
| 4,521,468 A | 6/1985 | Brandt | |
| 4,707,973 A * | 11/1987 | Deux et al. | 56/328.1 |
| 4,757,674 A | 7/1988 | Compton | |
| 4,776,156 A | 10/1988 | Brown et al. | |
| 4,793,128 A | 12/1988 | Creed | |
| 4,893,458 A | 1/1990 | Compton | |
| 4,921,073 A | 5/1990 | Compton | |
| 4,932,195 A | 6/1990 | Compton | |
| 4,986,065 A | 1/1991 | Compton | |
| 5,103,625 A | 4/1992 | McCrill | |
| 5,247,787 A * | 9/1993 | Snell | 56/340.1 |
| 5,406,153 A * | 4/1995 | Flatau et al. | 310/26 |
| 5,406,780 A | 4/1995 | Laserson et al. | |
| 5,413,453 A | 5/1995 | Hill | |
| 5,467,588 A | 11/1995 | Compton | |
| 5,469,695 A | 11/1995 | Zehavi et al. | |
| 5,473,875 A * | 12/1995 | Zehavi et al. | 56/340.1 |

(Continued)

OTHER PUBLICATIONS

Snell, L.D., "Force and moment analysis of stacked counter rotating eccentric mass tree shaker energy-wheel system", Thesis, Master of Science, Agricultural Engineering, Iowa State University, Ames, Iowa, (2008), 77 pgs.

*Primary Examiner* — Thomas B Will
*Assistant Examiner* — Joan D Misa

(57) ABSTRACT

In an example, a system for harvesting nut and fruit trees includes an electro-mechanical shaker head, a transport mechanism, and a control system. The electro-mechanical shaker head is configured to dislodge fruit or nuts from a target tree using a linear energy system. The transport mechanism is configured to position the electro-mechanical shaker head on the target tree. The control system is communicatively coupled to the shaker head and configured to dynamically control shaker head operation.

22 Claims, 14 Drawing Sheets

(56) References Cited

U.S. PATENT DOCUMENTS

| | | | |
|---|---|---|---|
| 5,510,660 A * | 4/1996 | Flatau et al. | 310/26 |
| 5,595,054 A * | 1/1997 | Reynolds de Sousa et al. | 56/340.1 |
| 5,653,097 A | 8/1997 | Hill | |
| 5,685,773 A | 11/1997 | Meester et al. | |
| 5,705,863 A * | 1/1998 | Teter | 310/26 |
| 5,765,349 A * | 6/1998 | Michelson | 56/328.1 |
| 5,813,910 A | 9/1998 | Meester et al. | |
| 5,816,037 A | 10/1998 | Chiel et al. | |
| 6,178,730 B1 | 1/2001 | Visser | |
| 6,658,834 B1 | 12/2003 | Mayo | |
| 6,978,591 B2 * | 12/2005 | Zehavi et al. | 56/340.1 |
| 7,255,290 B2 | 8/2007 | Bright et al. | |
| 7,694,503 B2 * | 4/2010 | Garrido Madorran | 56/340.1 |
| 7,810,306 B2 * | 10/2010 | Pellenc et al. | 56/340.1 |
| 7,810,307 B2 * | 10/2010 | Pellenc et al. | 56/340.1 |
| 7,918,078 B2 * | 4/2011 | Poggiagliolmi et al. | 56/340.1 |
| 7,999,422 B2 * | 8/2011 | Dorel | 310/26 |
| 2004/0079065 A1 * | 4/2004 | Zehavi et al. | 56/340.1 |
| 2006/0026943 A1 * | 2/2006 | Gurri Molins | 56/340.1 |
| 2011/0139476 A1 * | 6/2011 | Roser et al. | 173/141 |

* cited by examiner

NUT AND FRUIT HARVESTING APPARATUS, SYSTEMS AND METHODS

CLAIM OF PRIORITY

This patent application claims the benefit of priority, under 35 U.S.C. §119(e), to U.S. Provisional Patent Application Ser. No. 61/238,553, entitled "NUT AND FRUIT HARVESTING APPARATUS, SYSTEMS AND METHODS," filed on Aug. 31, 2009, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009, Lloyd D. Snell. All Rights Reserved.

FIELD OF THE INVENTION

The present invention relates to nut- and fruit-harvesting equipment, more particularly to a harvesting apparatus for dislodging nuts and fruits from the tree limbs by attaching to a singular point on the tree trunk, or primary/scaffold limb, and applying a force sufficient for removing the crop.

BACKGROUND

Orchards require a large investment in time and capital to enter full production, damaging trees during harvest threatens the productive value of the orchard. Mechanical harvesting mechanisms, typically a shaker, produce forces that can damage trees. Standard tree shakers require secondary systems to prevent damage to the trees by diffusing and mitigating the forces that can cause damage to the trees.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
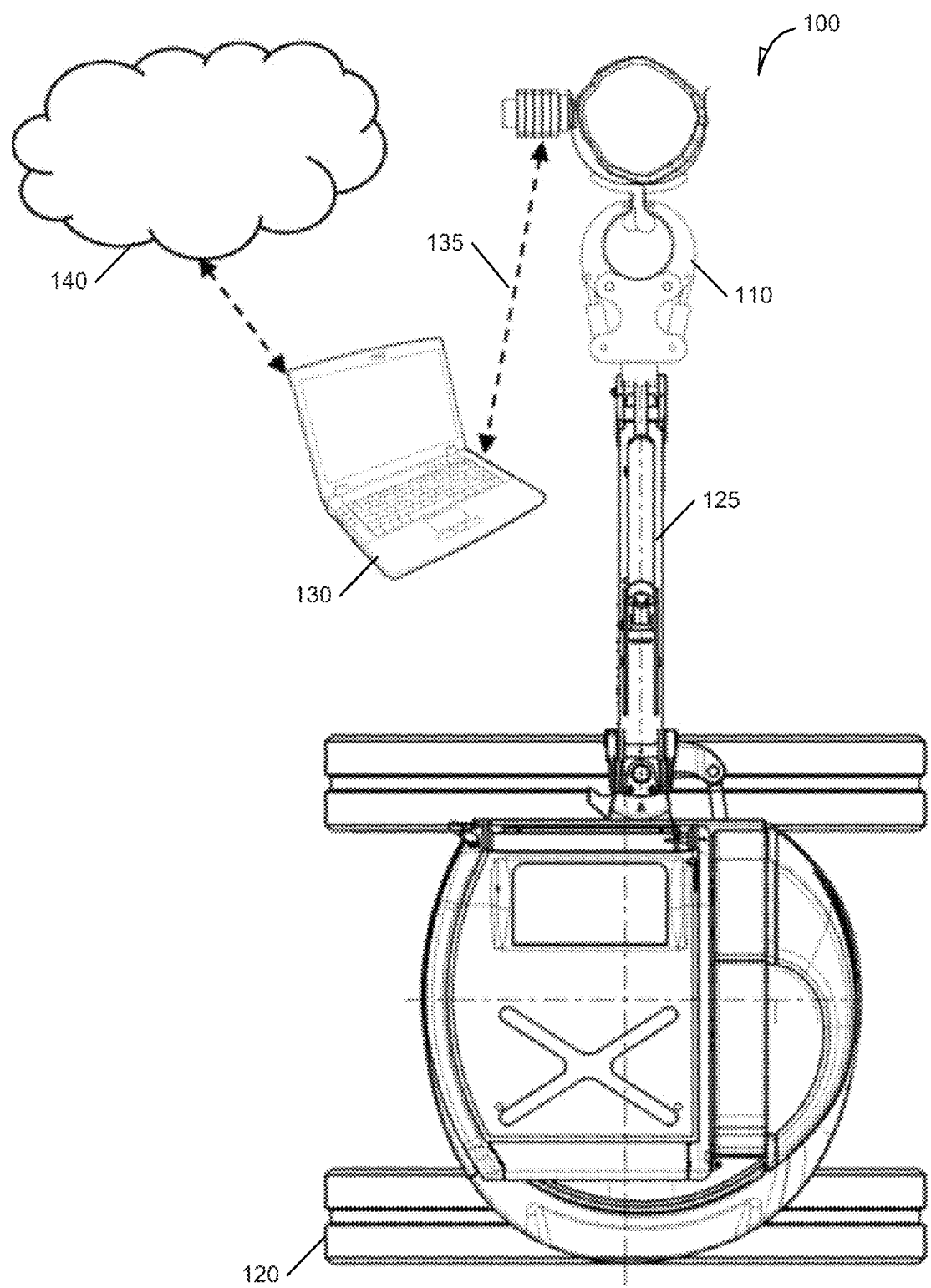
FIG. 1 is a block diagram illustrating an example system for harvesting fruit and nut trees.

Mechanical systems can be employed to automate the harvest of certain types of produce, such as fruits and nuts. One approach that has been applied to automate the removal of fruits and nuts from trees involves the use of energy-wheels. While generally successful at removing the target fruits or nuts, energy-wheel based systems are known to have multiple problems. For example, the size of the shaker head and method of producing the shaking forces have the potential of causing serious damage to the tree being harvested. Additionally, energy-wheel based systems require a large amount of energy to overcome the mechanical losses in the suspension system, diffusion loss associated with slings and pads, and restitution forces of the tree.

Overview

Tree Shaker Technology

One approach to mechanizing the harvest of fruit and nut trees is through the use of a tree shaker. Tree shakers literally shake the fruit and nuts out of the tree. One example approach to tree shaker technology is illustrated in MULTIPLE-PATTERN TREE SHAKING MECHANISM, U.S. Pat. No. 4,409,782, to Westergaard et al., particularly FIG. 1A. This approach to tree shaker systems is typically comprised of a transportation system and a suspended welded shaker head structure. These shaker heads are usually attached to the transportation system by a non-rigid suspension system, typically comprised of chains or isolator mounts and C-brackets, providing some level of flexibility. The transportation and suspension systems are designed to permit the shaker head to be adjusted for height, tilt, and roll for best clamping position normal to the axis of the tree trunk. The best clamping position is the position on the tree that minimizes the stress applied to the tree trunk and transportation system. In this approach, the shaker heads are typically high-powered hydro-mechanical systems that drive a highly stable tree system into a forced dynamic response. The tree shaker head's mass, often significantly larger than the mass of the tree, couples the overwhelming energy of this hydro-mechanical system to the tree at a singular location using hydraulic cylinders and opposing clamping arms. The tree shaker head will typically include a system of pads and slings to conform to the tree. The pads and slings provide force transmission and diffusion. The outer and inner sling contacting surfaces are lubricated minimizing the coefficient of friction, thus dissipating non-normal forces and coupled moments. Forces normal to the tree trunk are transferred through the pads and sling displacing the tree. Additional energy can be absorbed by the reaction forces applied by the transportation structure.

Hydraulic and PTO Powered Tree Shakers

Tree and crop shakers are often mounted to custom transportation systems and/or standard farm equipment. The custom transportation systems can include mono booms, side mounts, catch frames, and over the row structures. Simpler tree shakers for low volume production can be mounted to a farm tractor's three point hitch system. The transportation system can also functions as a constraining structure diffusing unwanted forces. Example shaker heads powered by standard power take off (PTO) shafts are illustrated in U.S. Pat. Nos. 3,964,244, 4,275,548, 4,414,795, 5,247,787, 5,413,453, 5,469,695, 5,473,875, and 5,595,054.

Energy-Wheels

One mechanical approach for creating the forces that dislodge the fruit and nuts from the tree are a pair of, upper and lower, eccentric mass counter rotating energy-wheels. The typical energy-wheel in a tree shaker head converts hydraulic pressure and flow into a vector force. Energy-wheels are typically attached to a common shaft, which is securely attached to the shaker head structure, resulting in the summation two vector forces into a resultant force. The energy-wheels are typically belt driven by a hydraulic motor mounted to the shaker head structure. An energy-wheel system will often include multiple wheels that are driven in opposite directions, have unique masses, and different angular velocities, to produce the desired forces patterns. The rotating energy-wheels create a series of force maxima and minima. A pseudo-random variation of the shaking pattern is typically achieved by varying the engine or hydraulic drive motor speed resulting in the frequency and magnitude of minima, maxima, and coupled moments.

The vibration of the tree is created by the operator actuating a hydraulic system causing energy-wheels to rotate. Historically, the frequency of the mechanical system has been referred to as hertz (Hz), with units of radians/second. Yet the bi-directional energy wheel system is not a function of radian/seconds. The pulses that are created have both a magnitude and direction. Therefore, the correct notation would be to define the number of maxima per second and understand the there is direction. The direction, although a repeatable pattern, are not precisely repeatable due to timing change during belt slippage during acceleration and deceleration of the energy-wheels. The angular velocity of the energy-wheels is determined by physical mechanical system design, such as sheave ratios, and the operator inputs for engine speed and hydraulic system flow and may results in 0-40 maxima/sec radially distributed. In this approach a pulse frequency in the range of 0-40 maxima/sec is regarded as the preferred frequency to shake a tree and obtain maximum displacement. During this shaking process, the tree is displaced in both the x-, y-, and z-axis. These abrupt displacements force the trunk or limb in multiple direction resulting in the dislodging the nut or fruit from the tree.

Yet multiple independent rotating energy-wheels systems do not result in independently applied forces. When multiple energy-wheel system are constrained to the same shaker head frame structure and connected to a single point of interaction with the tree, the resultant force is the sum of all of all the vector forces. Thus, the summation of the individual energy-wheel forces results in a singular resultant force vector with maxima and minima. An example of this approach is illustrated by TREE SHAKER, U.S. Pat. No. 4,170,100 to Hood et al.

Natural Frequency

A simple fact is that trees are like snowflakes, no two are identical. The tree trunk and the total system of branches are a non-isotropic structure creating uniquely different dynamic systems. Each tree's dynamic system is also affected by tree structure, moisture content, temperature, and time of day, among other things. As a result, each tree exhibits a unique and wide varying natural frequencies (Hz) at which shaking is most efficient. Natural frequency can be measured and referred to as the singular axis displacement as a function of time and can be plotted as radians/sec (Hz). This creates several issues preventing further optimization of bidirectional eccentric mass energy-wheel systems. First, the eccentric mass energy-wheel system is not a single axis energy system measurable in Hz. Second, trees are critically damped and small deviations from the natural frequency results in absorption of the applied energy. Therefore, requiring higher energy input. Third, the current mechanical shaker head system cannot be optimized by species, age, trunk diameter, or any other measurable variable. Without optimization the system is likely to remain an overpowering system at the expense of the tree.

With the mass of the energy-wheel based shaker head being greater than the tree, the dominant response to the input is that of the shaker head not the tree. If a shaker head is not operated at the natural frequency of the combined system large amounts of energy can be lost. This energy loss is seen as heat and high cycle fatigue. Since the hydro-mechanical energy-wheel based systems lack the inherent control necessary to achieve or maintain the combined system's natural frequency, the system must be large enough and powerful enough to overpower the tree dynamics, survive the effect of energy loss, and harvest the crop.

The Battle of Forces

The energy-wheel approach exhibits further inefficiencies in overpowering the natural tree dynamics due to a battle of forces occurring during harvesting. For example, the eccentric mass energy-wheel approach drives the tree in the direction of the initial pulse. The resultant force moves the tree in an arc, causing an increasing force within the tree until the tree develops a maxima restitution force vector equal to and opposite the energy-wheel at the initial pulse, t1. At t1, the tree applies the restitution force equal and opposite the energy-wheel force pulse maximum. From t1 till t2 the next tree shaker pulse maxima, the balance of forces between the tree shaker and the tree become conflicting. As the force applied by the shaker decreases from a force maximum to a minimum, a moment maxima is the predominant mechanical energy produced by the energy wheels. At the force minima the shaker head is twisted about the tree trunk due to the coupled moment maxima. This twisting force if not diffused by the slings can create a shear force that results in tearing the bark from the tree trunk, permanently damaging the trees nutrition system. The energy-wheel system is a continuous time function consisting of three force and three moment components. The results are a repeating series of force maxima and minima and coupled moment maxima and minima. Were the coupled moment minima occurs when the force is a maxima and vice versa. If the shaker energy could be instantaneously turned off and the inertia of shaker head removed, the tree would overshoot the static steady state condition and decay to steady state quickly. If the next shaker impulse were directly opposite of maximum at t1; the tree would be driven at the natural frequency and would experience substantial amplitude gain. But with the shaker head attached and often having a mass much greater that the tree mass the tree will be forced to respond to the inertia of the shaker head and the next force maxima of the energy-wheels.

Slings and Pads

Mechanical tree shaking has evolved into a high throughput system with relatively low damage rates yet damage is readily seen by surveying most any orchard. Production losses of 1% annually have been attributed to shaker damage, resulting in between 1024 kg/hectare and 1814 kg/hectare in harvest loses. This damage rate represents the hidden cost of tree harvesting that is greater than the physical cost of man and machine. Using the energy-wheel approach, achieving damage rates as low as 1% annually requires robust energy diffusion systems to prevent biological damage during the clamping and shaking process. These secondary damage control systems are commonly defined in the industry as pad and slings. Pad and slings when properly maintained and lubricated prevent/minimize localized trunk or limb damage. Pads and slings provide two primary functions. First they conform to the tree providing a firm attachment of the shaker head to the tree. Second, the slings are lubricated to allow undesired forces to dissipate as heat, preventing the transmission of additional potentially damaging forces to the tree trunk. Heat dissipation can be assisted by subsystems of the pads and slings that blow cooled air or circulates fluid through the pads conducting the heat to the atmosphere or a closed loop cooling system.

Coordinate System Definition

A typical coordinate system assigned to a tree has the x-axis parallel with the tree row, the y-axis is perpendicular to tree row and the z-axis extends through the centerline of the tree normal to the soil surface. The axis of rotation about the x, y, and z axis are defined as θx, θy, and θz.

Energy-Wheel a Non-Linear System

The energy-wheel based approach has historically been represented as producing a planer sequence of force pulse maxima and minima. However, the nature of the hydro-mechanical energy-wheel systems are not simple planer or a linear systems and cannot be made to perform like linear systems through the use of mechanical constraints or electrical (computer) system timing components. The rotation of eccentric mass energy-wheels results in both planer forces and coupled moments in both bidirectional timed energy-wheel systems and complex counter rotating or multiple eccentric mass energy-wheel shaker head systems. The resultant moment created by eccentric mass energy-wheels is non-value added and the primary contributing factor of heat generation in the pads and sling. The generation of heat is a negative and represents the loss of energy. The heat deteriorates the slings and pads requiring regular lubrication, rotation, and replacement. Moments and non-normal forces are damaging to the tree and represent substantial energy losses. The moments and non-normal forces can also cause vertical lifting, shear forces, and tensional forces during the tree harvesting process that are damaging to tree biology without out proper secondary systems.

Open Loop Control

The current tree shakers are open loop controlled systems. There are no feedback to the systems that controls the applied forces and timing based on the trees and attached shaker head. Current shakers are merely turned on and off by and operator.

Example Embodiments

Smart Tree Shaker Technology

In order to compensate for the near infinite variation in tree dynamics, unwanted forces created by rotating energy-wheel systems, and excessive energy dispersion through secondary systems discussed above, the Inventor has developed smart tree shaker technology to minimize the potential for biological damage and reduce energy consumption. Smart tree shaker technology can include the use of true linear force driver, real-time control to optimize tree dynamic amplification and minimize force input, significant shaker head mass reduction, and shaker head disconnection from the transport mechanism during the excitation process to harvest fruit and nuts. The use of a true linear driver can eliminate or at least minimize the creation of undesired forces, such as the coupled moments and non-normal forces created by the energy-wheel approach. A linear driver can be aligned with the tree centerline to prevent the introduction of moments about the trunk or limb. Disconnection from the transport mechanism during shaking removes unwanted constraints associated with suspension systems and reduces energy requirements. A linear energy system applied to the trunk or scaffold limb centerline reduces or eliminates the need for energy absorbing subsystems such as the pads and slings required by the energy-wheel approach. In an example where a linear energy system cannot be aligned with the centerline, pads and slings may continue to be used. Eliminating undesirable mechanical forces allows for reducing the reacting structure and ultimately the mass of the shaker head. Lower shaker head mass supports the detachment from the transportation system and the further reduction of input energy required to achieve the necessary tree dynamics. One reason for the reduction in input energy is the lighter shaker head can work with the tree dynamics instead of having to dominate the combined system. Finally, the smart tree shaker technology allows for real-time feedback and control of the combined dynamic system.

Advanced Linear Pulse Tree Shaker

In an example, an advanced linear pulse tree shaker (ALPTS) has been developed. The ALPTS is an example of smart tree shaker technology. In an example embodiment, the ALPTS system can apply a linear force, rapidly and precisely adjusted in real time for the individual initial and changing dynamic properties of each tree targeted for harvest. A tree's dynamic properties will be effected by the reduction in mass due to dislodging of the crop. In an example, the ALPTS system includes a magnetostrictive linear actuator (MLA), which is used to deliver linear force pulses during harvesting operations. In a particular embodiment, the MLA is an electro-mechanical linear energy system that is capable of applying precisely timed force impulses in an axial direction along the length of the actuator. The force impulses can be dynamically controlled with a closed-loop controller. In an example, the closed-loop control can be controlled by either the measurement instruments such as accelerometers or the lead and lag relationship of the input variables of voltage and current. The closed-loop controller using real time data from an accelerometer is capable of monitoring acceleration and integrating velocity and position values of the tree with the ALPTS attached.

The energy system of the ALPTS system can be controlled by a closed loop control system. Closed loop control can control the forces in a manner that overcomes the natural damping of the tree. Since the shaker head is disconnected from the transportation system, and no suspension system exists, no additional damping forces exist, as in prior tree shaking systems. Force can be precisely timed to be applied when velocity is zero and acceleration is at a maximum. Precise timing minimizes the force applied, to maximize the displacement amplification, while using minimal energy input. In the event of a limb failure the closed loop control detects the frequency change and can automatically adjust applied force timing to the system's new natural frequency. The ALPTS system can be visualized like a child swinging. Each time the child reaches the highest point of the arc the velocity is at zero and the acceleration is at a maximum, a sensor can determine this event. A small force with short amplitude amplifies the acceleration and increases the subsequent amplitude of the swing. The ALPTS system is capable of exploiting the same principals through real-time dynamic control.

The MLA is constructed from a class of smart materials, which include electrostrictive, ferroelectric, and piezoelectric materials. Magnetostriction is a property of ferromagnetic materials that causes the material change shape when subjected to a magnetic field. Magnetostriction allows for the conversion of magnetic energy into kinetic energy. The combination of electromagnets and magnetostrictive materials allow for efficient electrical to mechanical power conversion within a relatively small package. The high speed and power density of magnetostrictive materials allows for large forces to be created with relatively small masses and power input. For example, a small magnetostrictive actuator can create a 4 kN force at 1000 Hz with a 1 kg mass and a 100 µm stroke length. Larger magnetostrictive actuators can be constructed capable of creating forces exceeding 200 kN.

Magnetostrictive materials are used within the MLA allow for high acceleration rates, not obtainable with hydraulic systems or other electro-mechanical actuators. The high acceleration rates allow for smaller masses to create larger reaction forces, thus enabling significant reductions in shaker head mass. The MLA can be operated through out a frequency range of 1 Hz-40 kHz. This large operating range allows for both low and high frequency application of force. The large operating frequency range also allows for application of phase shifts, ratios, and multiples of the natural frequency, of the shaker head and tree combination, to optimize the harvesting process. The MLA also allows for frequency and force impulse magnitude to be independently controlled, further enhancing the ability to optimize the harvesting process. The operating characteristics of the MLA can allow for additional applications, such as winter tree cleaning for pest control, spring thinning for fruit set population thinning, or even selective harvesting of rip fruit such as coffee requiring frequencies significantly beyond the range of the current hydro-mechanical systems.

The ALPTS system includes subsystems such as the MLA (multiple MLAs in certain examples), a clamping system, accelerometer(s), detachable weights, transport vehicle detachment mechanism, electrical supply line, cooling system, power amplifier, and a computer control module. Optionally, the ALPTS system can also include wireless communication, internet connectivity, real time data transmission, and global positioning transponder to assist with production mapping and reporting.

FIG. 1 is a block diagram illustrating an example system for harvesting fruit and nut trees. The system 100 includes an ALPTS 110, a transport vehicle 120, and a control system 130. The ALPTS 110 is transported and positioned into a target tree by the transport vehicle 120. The transport vehicle can include a boom 125 or similar device to manipulating the ALPTS 110 into position. In an example, the transport vehicle 120 is a mini excavator with a boom arm 125. In other examples, the transport vehicle 120 can include a modified tree shaker, skid steer, industrial robot(s) mounted to a transportation system, farm tractor or a specially designed wheeled or tracked vehicle. The transport vehicle 120 can also provide power to operate the ALPTS system through standard hydraulic systems and hardware specific electrical generation system or some similar device.

Once the transport vehicle 120 positions the ALPTS 110 in the tree to be harvested, the ALPTS is clamped to the tree while detaching from the positioning boom 125. Detachment can be accomplished by collapsing the hydraulic cylinders (depicted in FIG. 4, 430A-N), releasing the clamping fingers (depicted in FIGS. 4, 420 and 425). The detached ALPTS 110 is operated without any mechanical connection to the transport vehicle 120. Detached operation eliminates the mechanical constraints and associated losses imposed by the positioning system (the boom 125 in the illustrated example). Operation disconnected from the transport vehicle 120 also allows the mass of the shaker head to be reduced and improves the force transmission efficiency to the tree or crop being harvested. Detached operation of the ALPTS 110, also allows for greater flexibility in transport vehicle 120 and positioning system, boom 125, selection or design, as these systems do not have to counter act any forces associated with the harvesting process reducing size, capital and operational cost of the system.

In this example, the control system 130 is communicatively coupled to the ALPTS 110 in order to control the harvesting operation. The communication link 135 can be wired or wireless. In a wired example, the control system 130 can use the physical system supplying electrical power run the communication link 135. In a wireless example, the communication link 135 can use any suitable short range wireless networking protocol, such as IEEE 802.11g or BLUETOOTH. The control system can also be connected to a wide-area type network 140 for production management and system usage monitoring.

Figure 2:
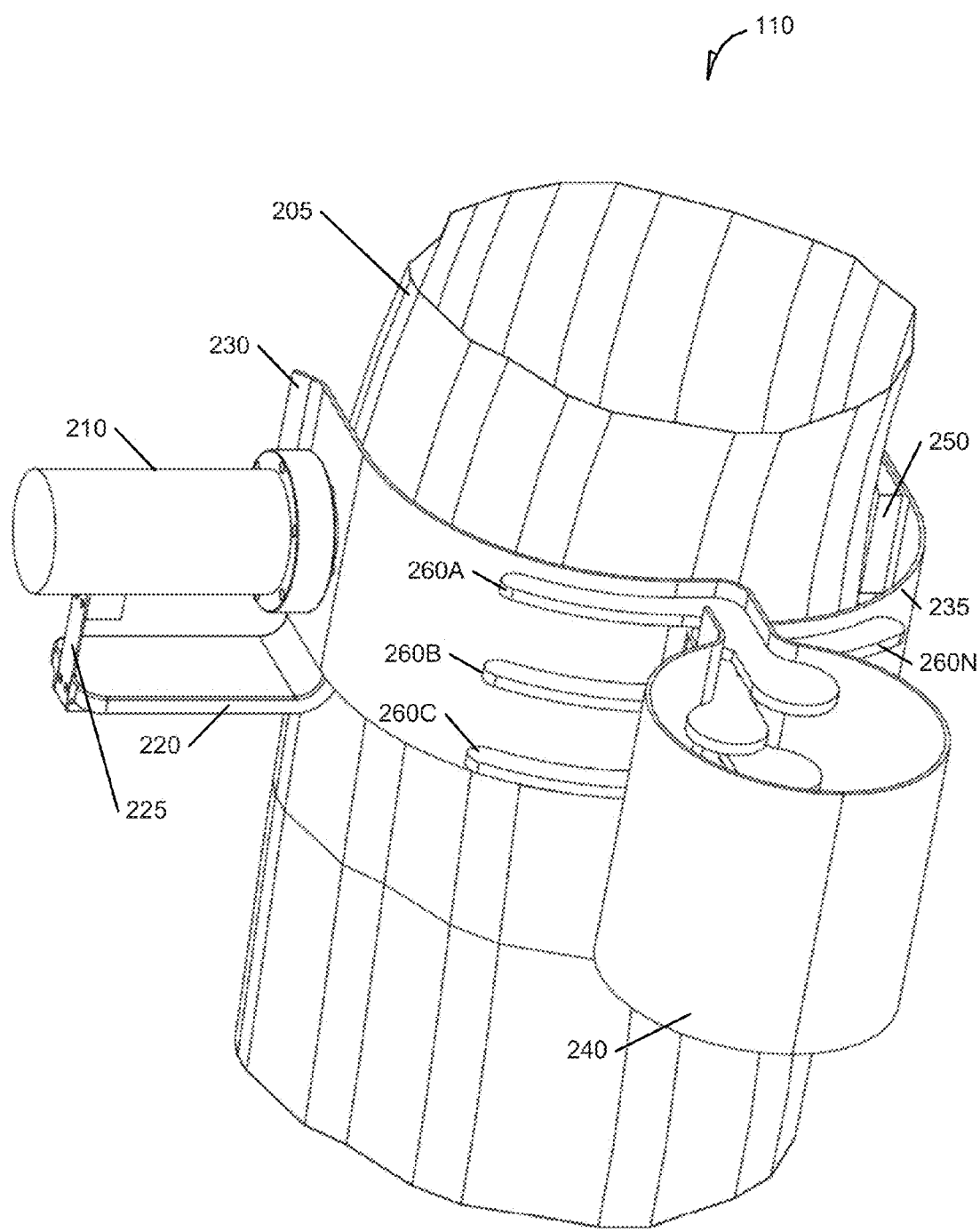
FIG. 2 is a line drawing illustrating an example advanced linear pulse tree shaker head assembly.

FIG. 2 is a line drawing illustrating an example advanced linear pulse tree shaker head assembly. The ALPTS 110 includes a MLA 210, an MLA mounting bracket 220, clamp arms 230, 235, a clamp spring 240, an interface pad 250, and clamp arm stiffener ribs 260A through 260N (herein after collectively referred to as 260). FIG. 2 also includes illustration of an example tree trunk 205 and how the ALPTS 110 can be clamped on to the tree trunk 205.

As discussed above, the MLA 210 is a linear energy system used to create the forces the ALPTS will impart onto the tree trunk 205 in order to harvest fruits or nuts. As shown in FIG. 2, the MLA is aligned with the centerline of the tree trunk 205 (or scaffold branch). Alignment along the centerline reduces or eliminates rotational forces about the tree trunk 205. Reduction or elimination of unwanted rotational forces also reduces the required complexity of attachment subsystems such as the slings and pads discussed above. In this example, the ALPTS 110 interfaces with the tree trunk 205 through a simple interface pad 250. While not illustrated in FIG. 2, each of the clamp arms 230 and 235 can include one or more interface pads 250. In certain examples, the clamp arms 230 and 235 include multiple interface pads 250 oriented vertically near the outer ends of the clamp arms 230, 235. As the configuration of the ALPTS 110 reduces or eliminates most potentially biologically damaging forces, the interface pads 250 primarily serve to secure the ALPTS 110 assembly to the target tree trunk 205 centerline and prevent rotation of the clamp assembly about the MLA 210 centerline.

In an example, the MLA 210 is secured to one of the clamp arms 230 with a mounting bracket 220. In certain examples the mounting bracket 200 includes a flexure plate 225. The flexure plate 225 allows for some relative movement of the MLA, with respect to the mounting bracket 220, during operation, prevents the introduction of moments that would damage the actuator. In certain examples, an additional MLA 210 can be mounted on the other clamp arm 235. In examples with multiple MLAs the control system 130 coordinates operation of each of the MLAs, such as MLA 210, to increase the overall effectiveness of the ALPTS 110.

The ALPTS 110 is secured to the target tree or crop with a clamping system that provides opposing compressive forces. In the example illustrated in FIG. 2 the compressive forces act on either side of the tree trunk 205. In this example, the clamp arms 230, 235 use a clamp spring 240 mechanism to produce the opposing compressive forces. The clamp spring 240 requires no moving parts, reducing weight and maintenance requirements. In this example, the clamp arms 230, 235 include stiffener ribs 260 to help deliver the compressive forces and increase the service life of the clamp arms 230, 235. Stiffener ribs 260 are used to improve rigidity while keeping overall weight of the ALPTS 110 assembly down. In another example, the clamping forces can be provided through the use of hydraulic, air, or electric actuators or cylinders. The primary function of the clamping arms 230, 235 is to provide sufficient clamping pressure to prevent the ALPTS 110 from dislodging during the harvest process.

The clamping forces required will vary depending on the weight of the particular ALPTS 110 assembly. Crops harvested from less rigid structures can be harvested with ALPTS 110 assemblies that use smaller lighter MLA 210 modules.

Figure 3:
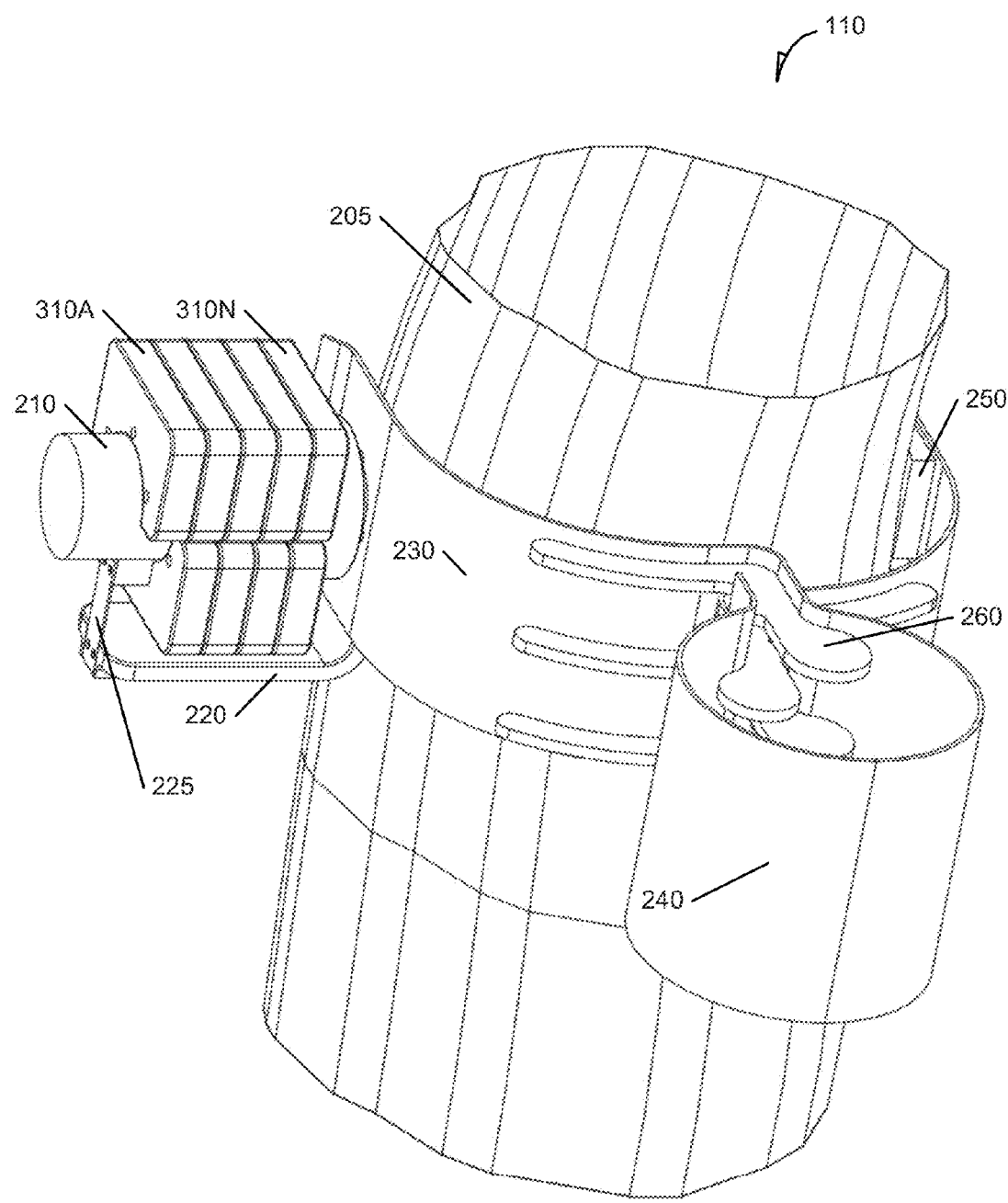
FIG. 3 is a line drawing illustrating an example advanced linear pulse tree shaker head assembly that includes optional weights.

FIG. 3 is a line drawing illustrating an example advanced linear pulse tree shaker head assembly that includes optional weights. In this example, the ALPTS 110 assembly includes weight modules 310A through 310N (hereinafter collectively referred to as 310). The weight modules 310 allow for flexibility in the overall mass of the ALPTS 110. In applications that require additional forces to dislodge the fruit to nuts to be harvested, additional weight modules 310 can be added increasing the mass of the ALPTS 110. The increased mass of the ALPTS 110 allows the system to deliver greater forces to the target tree trunk 205 per Newton's law force=mass*acceleration ($F=m*a$).

Figure 4:
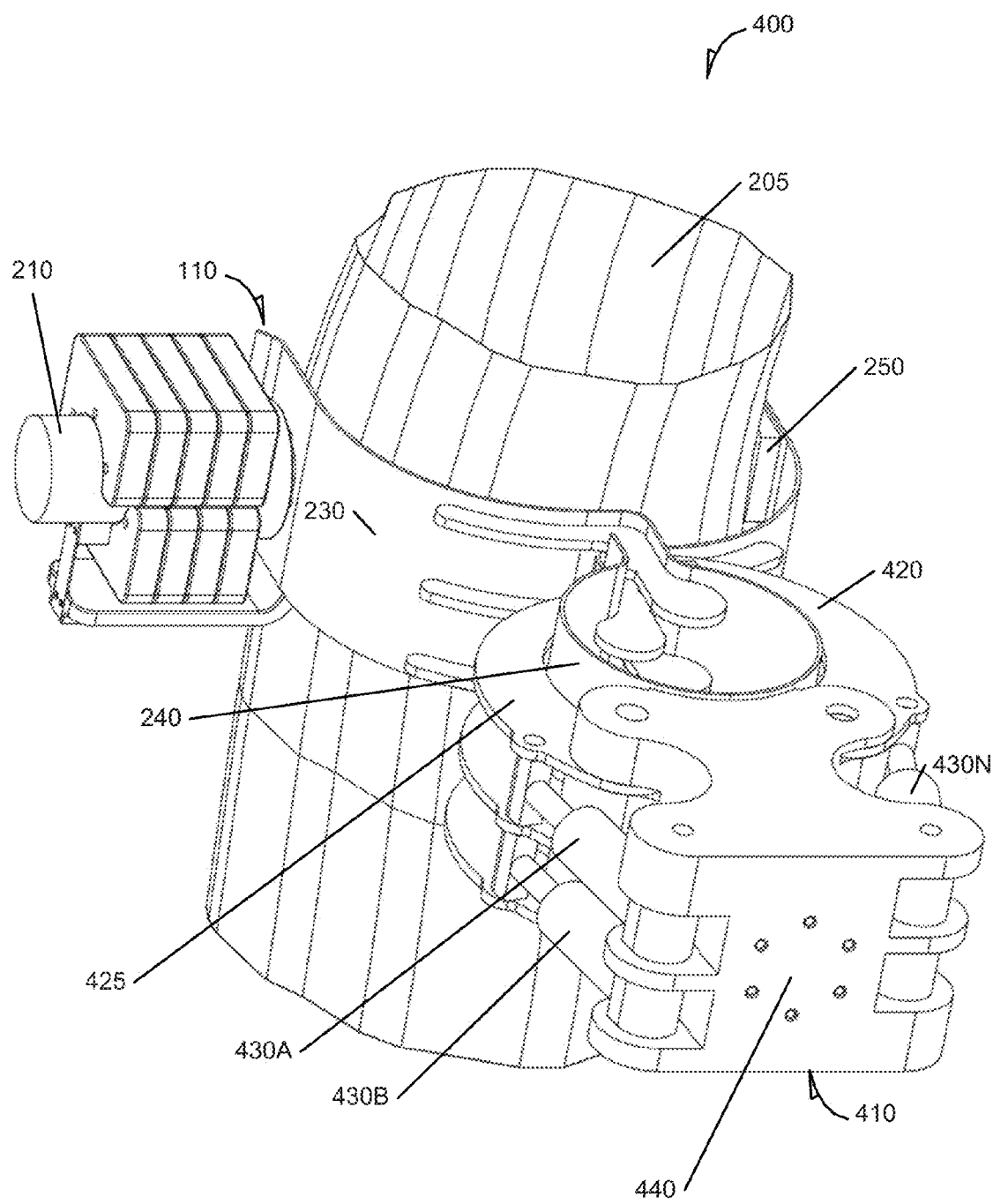
FIG. 4 is a line drawing illustrating an example nut and fruit harvesting system that includes an advanced linear pulse tree shaker.
Figure 5:
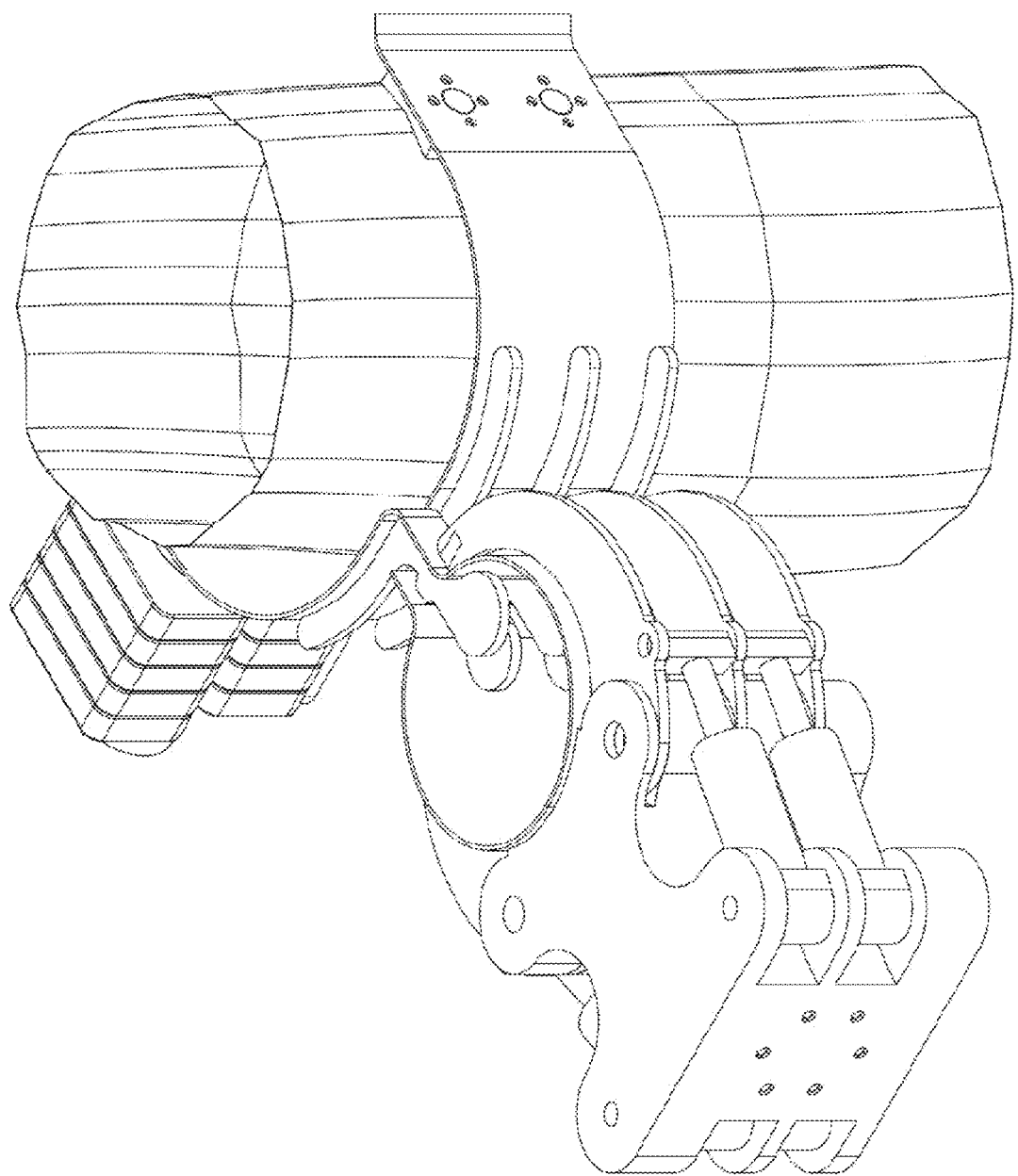
FIGS. 5-10 are line drawings providing additional perspectives on an example system for harvesting fruit and nut trees using an advanced linear pulse tree shaker.
Figure 6:
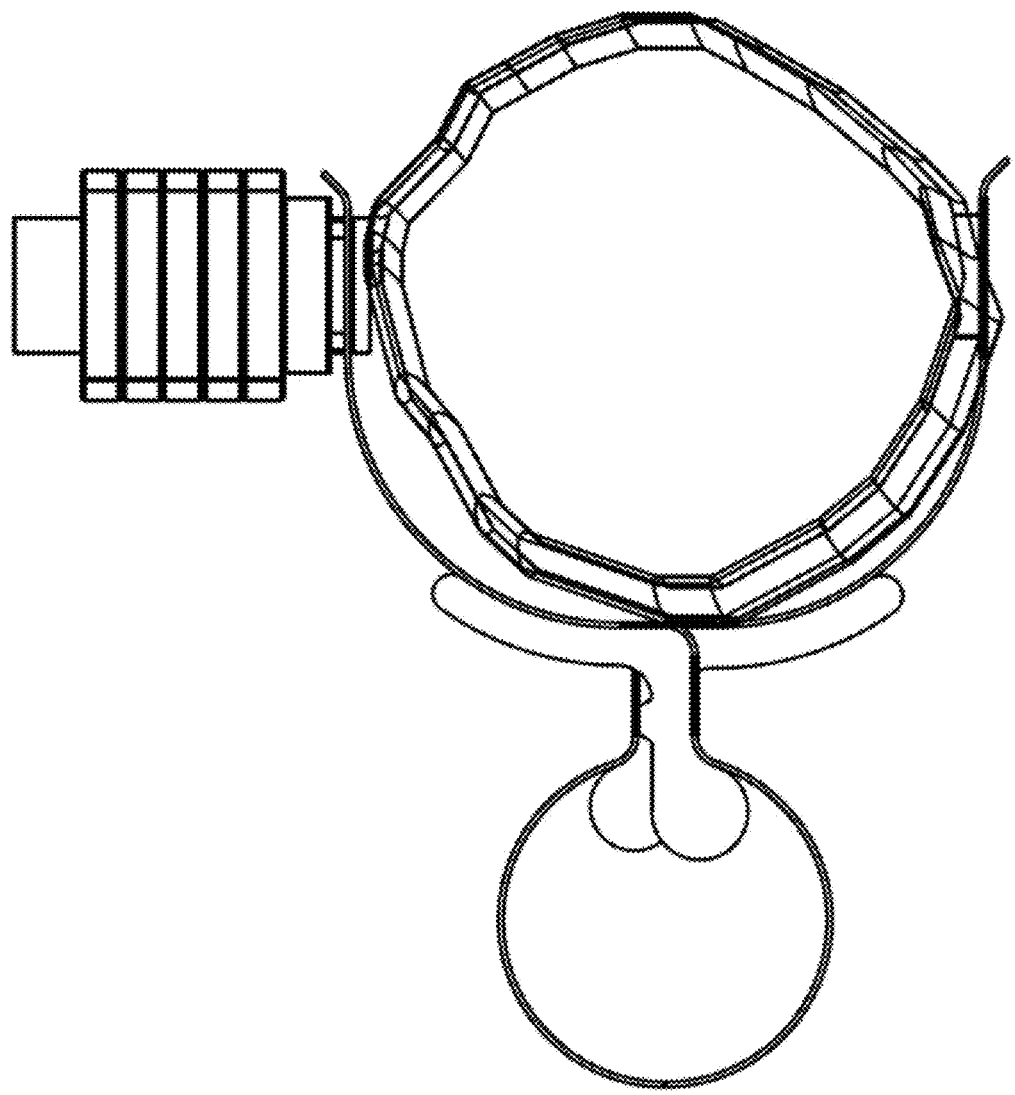
Figure 7:
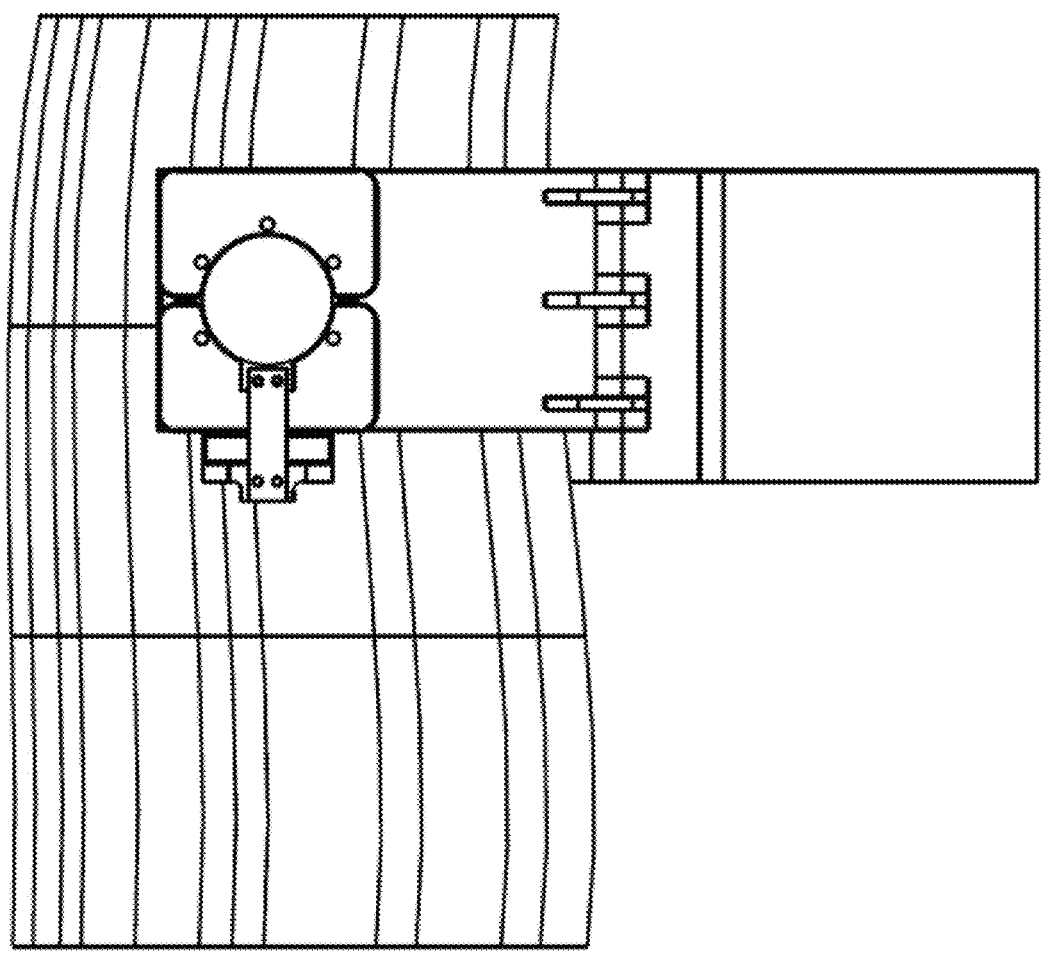
Figure 8:
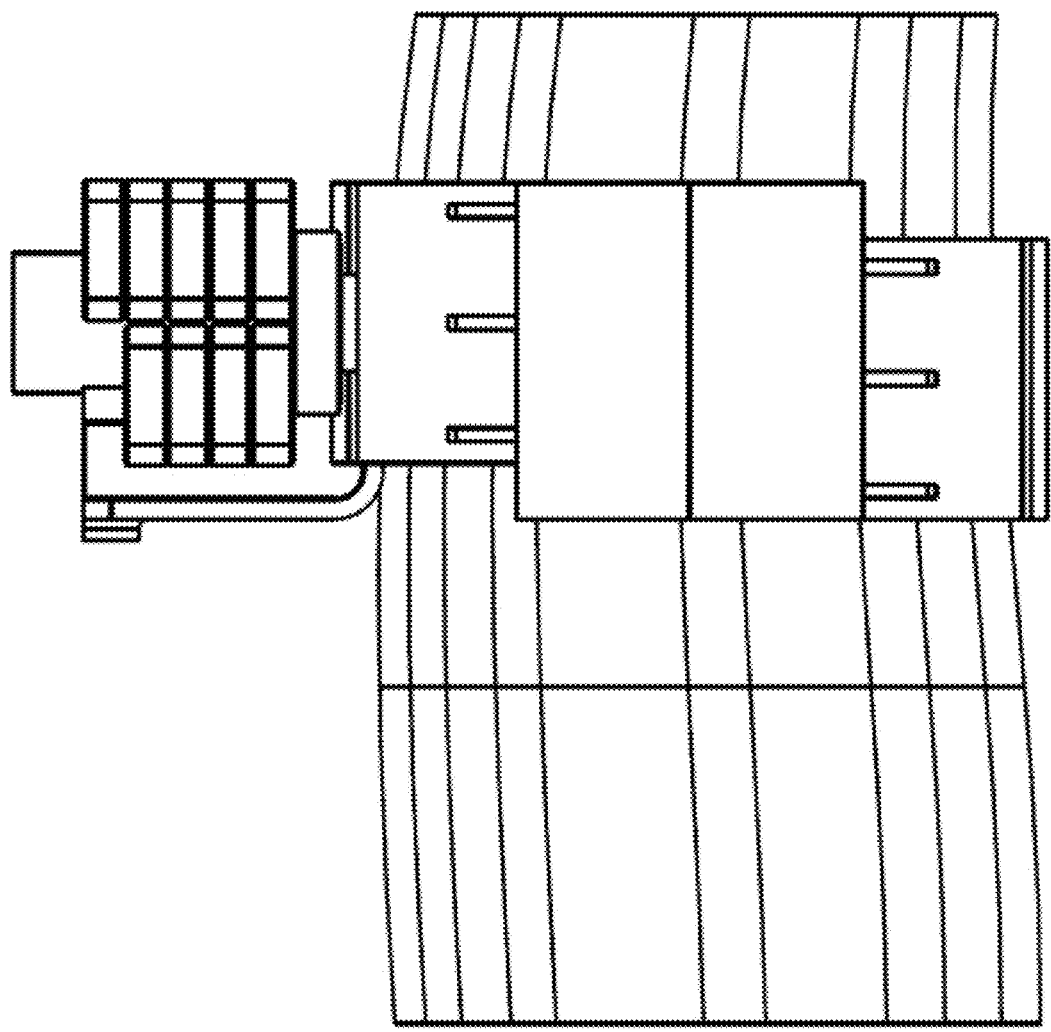
Figure 9:
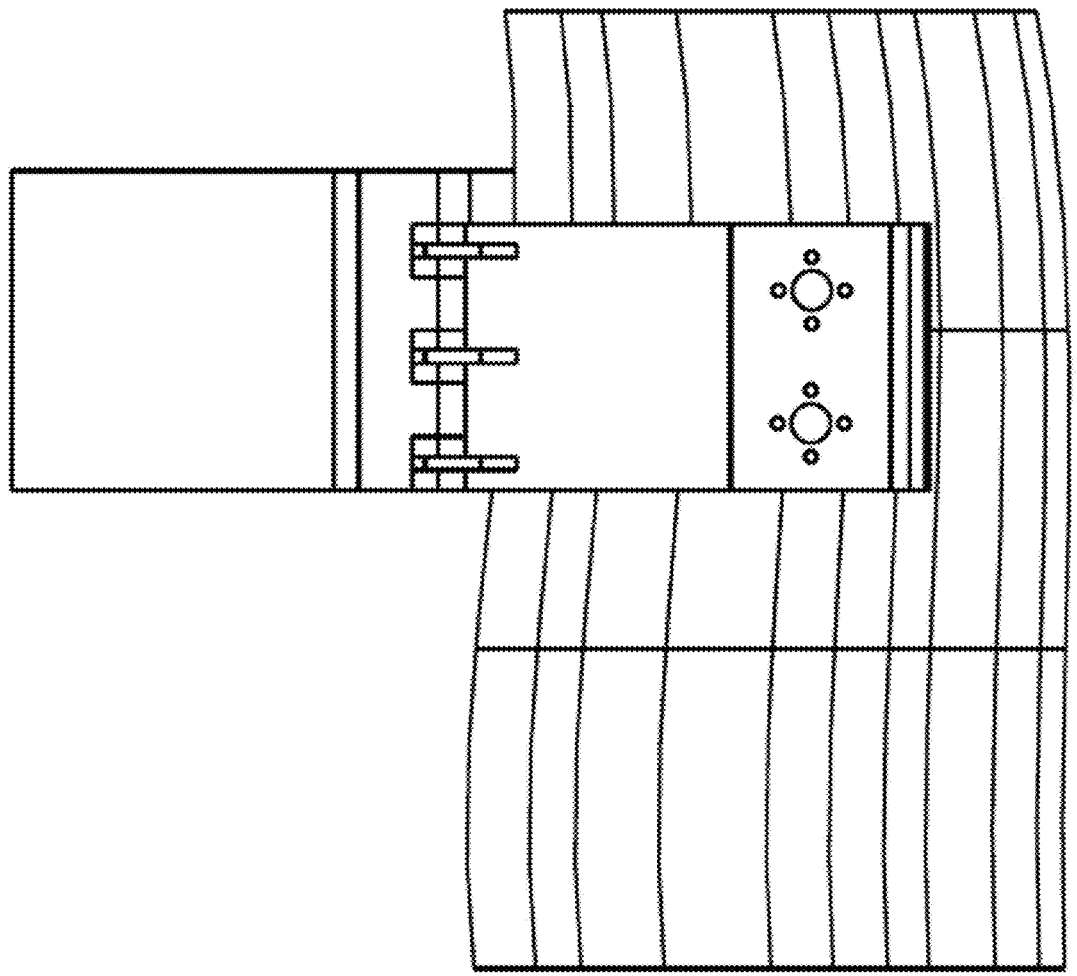
Figure 10:
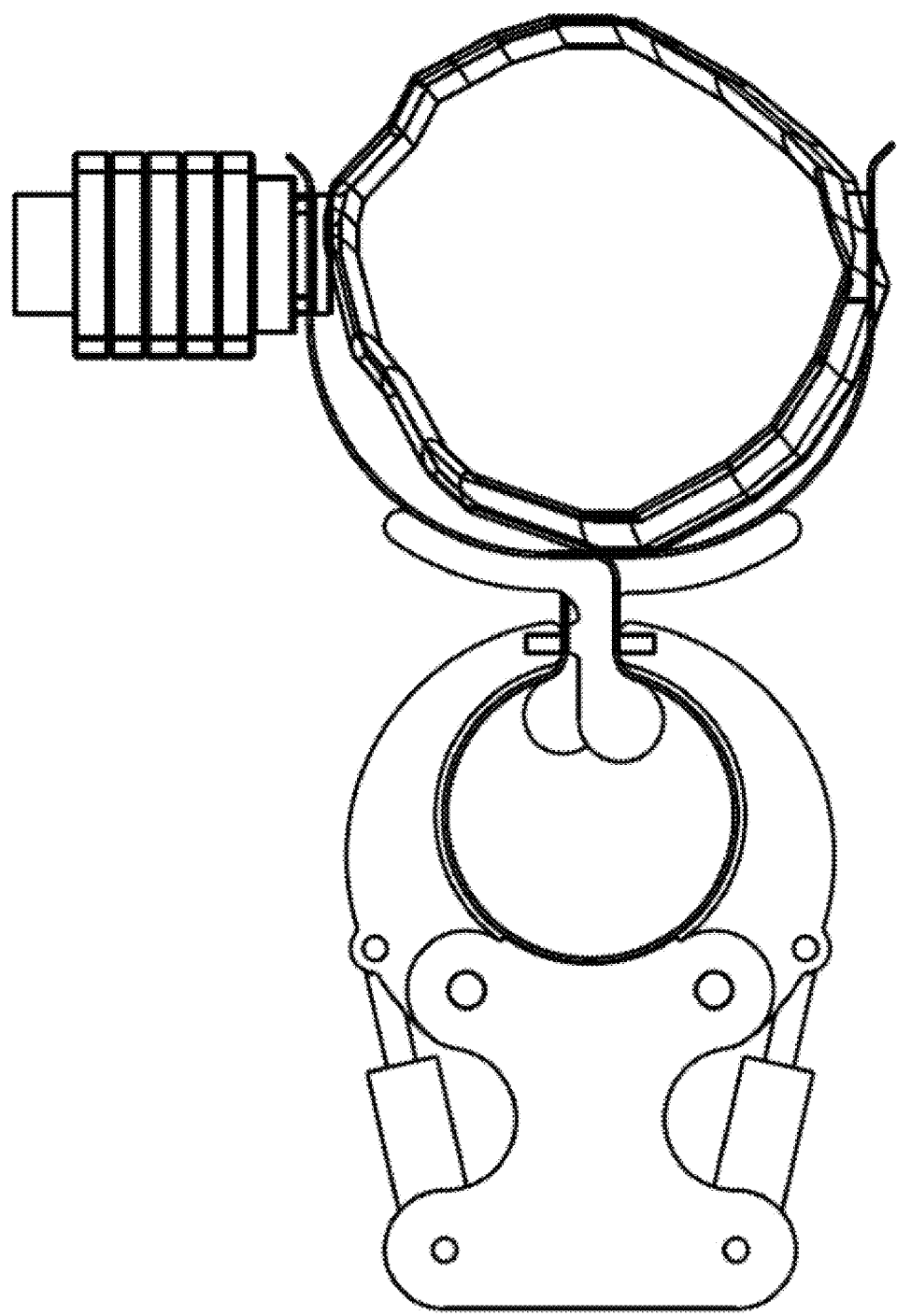

FIG. 4 is a line drawing illustrating an example nut and fruit harvesting system that includes an advanced linear pulse tree shaker. A system 400 includes an ALPTS 110 and a transport coupler 410. In this example, the transport coupler 410 includes clamp grippers 420, 425, gripper actuators 430A through 430N (hereinafter referred to collectively at 430), and a transport mount 440. The clamp grippers 420, 425 are configured to compress the clamp spring 240 and expand the gap between the clamp arms 230, 235. The gripper actuators 430 (four depicted in this example) are designed to exert the forces necessary to compress the clamp spring 240. In some examples, the gripper actuators 430 are hydraulic cylinders powered by a hydraulic pump located within the transport vehicle 120. In another example, the gripper actuators 430 are air cylinders powered by a compressor located on the transport vehicle 120.

Figure 11:
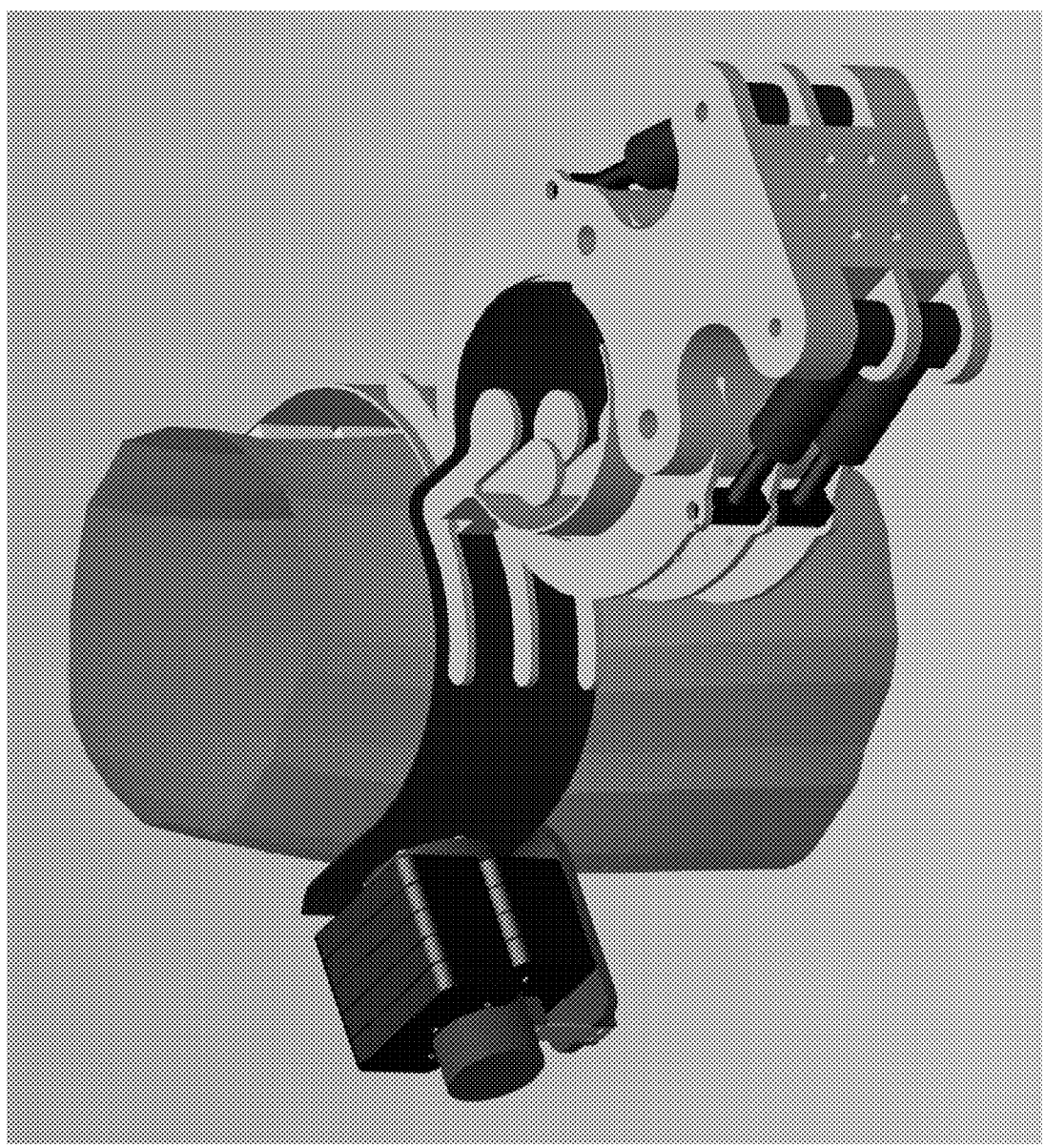
FIG. 11 is a solid model illustration of an example system for harvesting fruit and nut trees using an advanced linear pulse tree shaker.

FIGS. 5 through 10 are line drawings providing additional perspectives on an example system for harvesting fruit and nut trees using an advanced linear pulse tree shaker. FIG. 11 is a solid model illustration of an example system for harvesting fruit and nut trees using an advanced linear pulse tree shaker.

Figure 12:
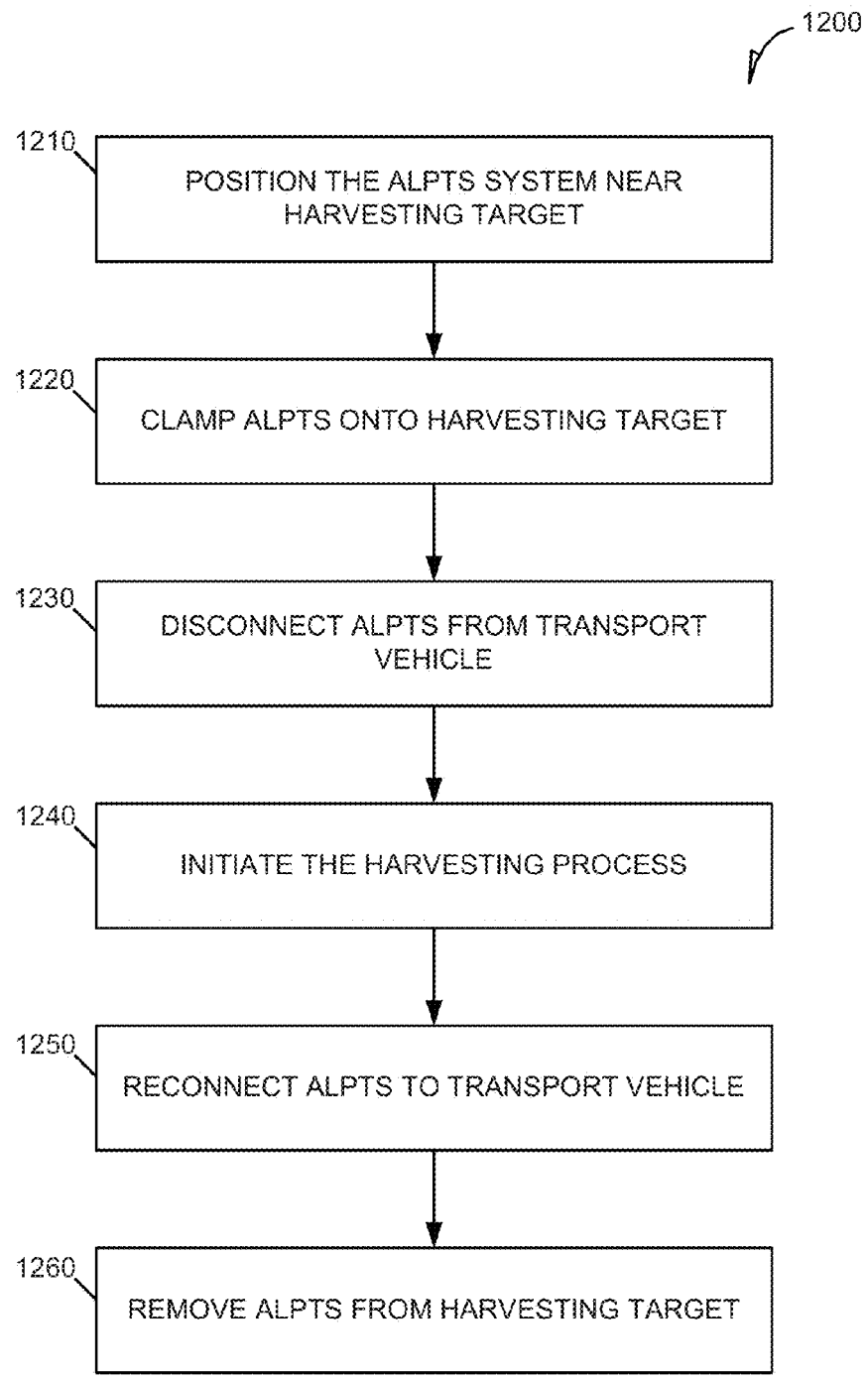
FIG. 12 is a flowchart illustrating an example method of harvesting fruit and nut trees with an advanced linear pulse tree shaker system.

Methods of Operation:

FIG. 12 is a flowchart illustrating an example method of harvesting fruit and nut trees with an advanced linear pulse tree shaker system. A method 1200 includes positioning the ALPTS system 100 near a harvesting target at 1210, clamping the ALPTS 110 onto the harvesting target at 1220, disconnecting the ALPTS 110 from the transport vehicle 120 at 1230, initiating the harvesting process at 1240, reconnecting the ALPTS 110 to the transport vehicle 120 at 1250, and removing the ALPTS 110 from the harvesting target at 1260.

In this example, the method 1200 begins at 1210 with the transport vehicle 120 positioning the ALPTS system 100 near a harvesting target. The harvesting target can be a tree or similar fruit or nut bearing plant. The method 1200 continues at 1220 with the transport vehicle 120 maneuvering the ALPTS 110 into position on the harvesting target and clamping the ALPTS 110 onto the harvesting target. Once the ALPTS 110 is clamped into position on the harvesting target, the method 1200 proceeds to operation 1230, where the transport vehicle 120 disconnects from the ALPTS 110. In an example, the ALPTS 110 remains tethered to the transport vehicle 120 by cabling that carries the electrical, hydraulic, or communication connections to the ALPTS 110. In certain examples, the cabling between the ALPTS 110 carries only the electrical power necessary to operate the MLA 210.

At 1240, the method 1200 initiates the harvesting process by activating the ALPTS 110. During the harvesting process the ALPTS 110 and the harvesting target become a single system, referred to as the harvesting system. During the harvesting process, the ALPTS 110 uses the MLA 210 to create linear impulse forces that work with the dynamics of the harvesting system to dislodge the fruits or nuts. The control system 130 monitors in real-time the harvesting process to maximize results while minimizing energy input into the harvesting system. The real-time monitoring by the control system 130 also allows the ALPTS 110 to adjust to changes in mass as the crop is harvested or to disruptive events, such as a limb failure. Additional details regarding the harvesting process are described below in reference to FIGS. 13 and 14.

Once the harvesting process is complete, the method 1200 continues at 1250 with the transport vehicle 120 reconnecting to the ALPTS 110. To reconnect and retrieve the ALPTS 110, the operator maneuvers the boom 125 on the transport vehicle 120 and grabs the ALPTS 110 with the transport coupler 410. Once the transport coupler 410 has secured the ALPTS 110, the method 1200 completes at 1260 with the transport vehicle 120 removing the ALPTS 110 from the harvesting target.

Figure 13:
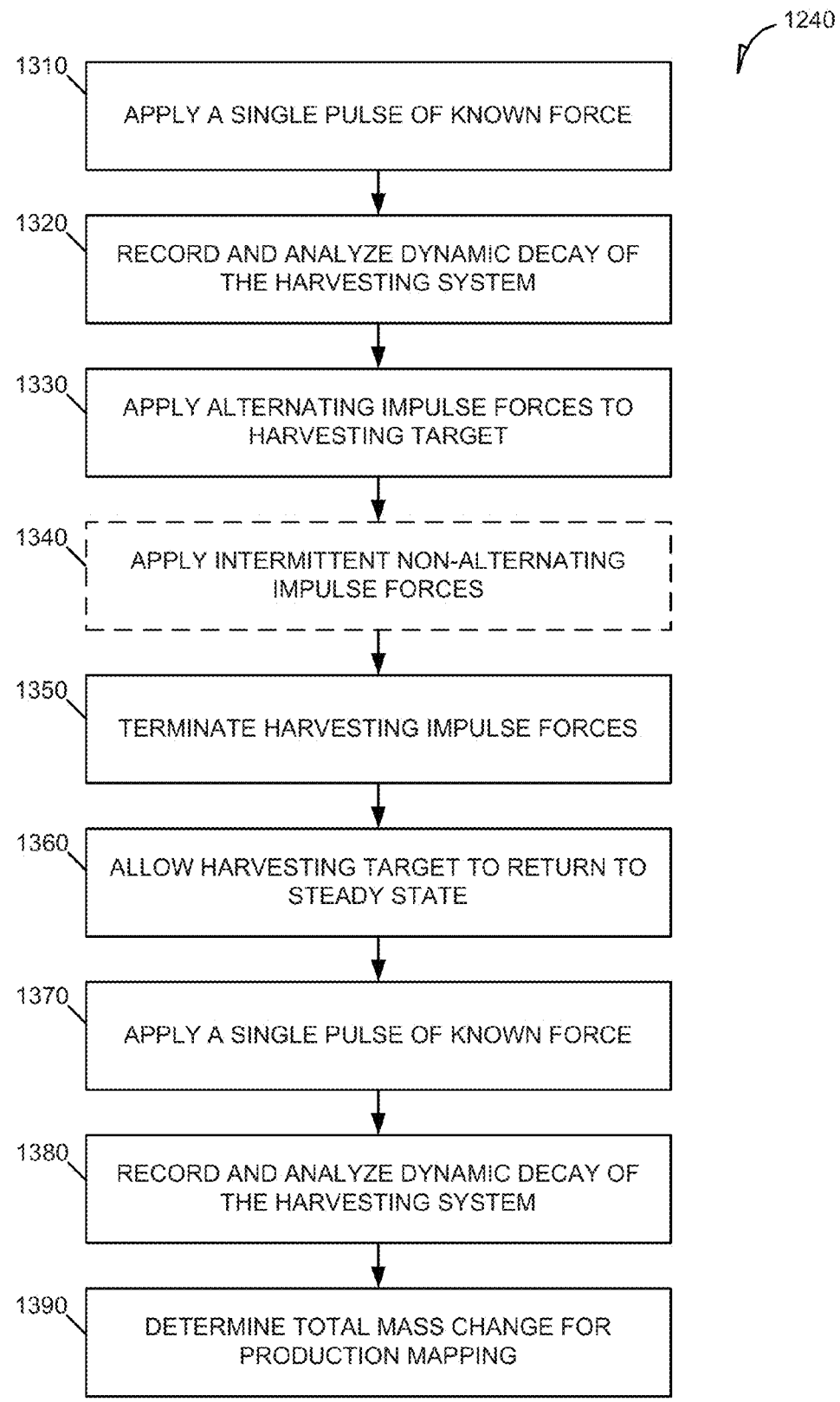
FIG. 13 is a flowchart illustrating an example method of harvesting fruit or nuts using an advanced linear pulse tree shaker.

FIG. 13 is a flowchart illustrating an example method of harvesting fruit or nuts using an advanced linear pulse tree shaker. A method 1240 includes applying a single pulse of known force at 1310, recording and analyzing the dynamic decay of the harvesting system at 1320, applying alternating impulse forces to the harvesting target at 1330, terminating the harvesting impulse forces at 1350, allowing the harvesting target to return to steady state at 1360, applying another single pulse of known force at 1370, recording and analyzing the dynamic decay of the harvesting system at 1380, and calculating the tree's mass change for field production data mapping at 1390.

The method 1240 begins at operation 1310 with the MLA 210 applying a single pulse of a known force magnitude to the harvest system (ALPTS 110 and harvesting target). Applying a known force provides the control system 130 with an opportunity to collect information on the dynamics of the combined harvesting system. At 1320, the method 1240 continues with the control system 130 recording and analyzing the dynamic decay of the harvesting system, after application of the known force. In some examples, the ALPTS 110 includes an accelerometer that provides dynamic response information back to the control system 130. Once the control system 130 analyzes the data from the initial application of force, the system 100 is ready to harvest the fruit or nuts.

At 1330, the method 1240 continues with the MLA 210 applying alternating impulse forces to the harvesting target. In an example, applying the alternating impulse forces starts with the MLA 210 delivering an initial impulse force causing the harvest target to displace. The control system 130 monitors the harvest system to determine the precise moment to apply an impulse force opposite to the initial pulse, e.g., something similar to the method used to make a swing go higher. Application of the returning impulse force can occur when the computer detects the correct slope and intersection zero velocity axis, or any other defined position and slope. The forces applied can be unidirectional or bi-directional, as determined by the crop harvest characteristics. The impulse forces can be continuously alternated between positive and negative amplifying the harvest target displacement and overcoming the harvest target's natural damping properties.

At 1340, the method 1240 can optionally include the application of non-alternating pulses by the MLA 210. The non-alternating pulses can be used to send shock waves through the harvest target to improve harvesting efficiencies. In certain examples, weights 310 can be added to or subtracted from the ALPTS 110 to adjust the magnitude of the pulses. The amplitude of the pulse created by the MLA 210 can also factor into the magnitude of the pulse delivered to the harvesting system. The MLA 210 can also be driven with different signal profiles to affect the magnitude or frequency of the pulses. The MLA 210 can be driven at fractions and multiples of the natural frequency of the harvesting system to improve harvesting efficiencies.

At 1350, the method 1240 continues with the control system 130 or the operator terminating the application of harvesting impulse forces. In some examples, the control system 130 determines the termination point through analyzing changes in the harvesting system, such as mass loss. In other examples, the operator controls the termination of harvesting, primarily through visual observation of the harvesting target. The method 1240 continues at 1360 by allowing the harvesting target to return to a steady state position. Once the harvesting target reaches steady state position, the method 1240 continues at 1370 with the ALPTS 110 applying a single pulse of known force to the harvest target. At 1380 the control system 130 records and analyzes the dynamic decay of the harvesting system. Finally, at 1390, the method 1240 completes with the control system 130 determining the total mass change in the harvesting system for production mapping purposes. The total mass change provides an indication of the amount of fruit or nuts harvested from the harvesting target.

Figure 14:
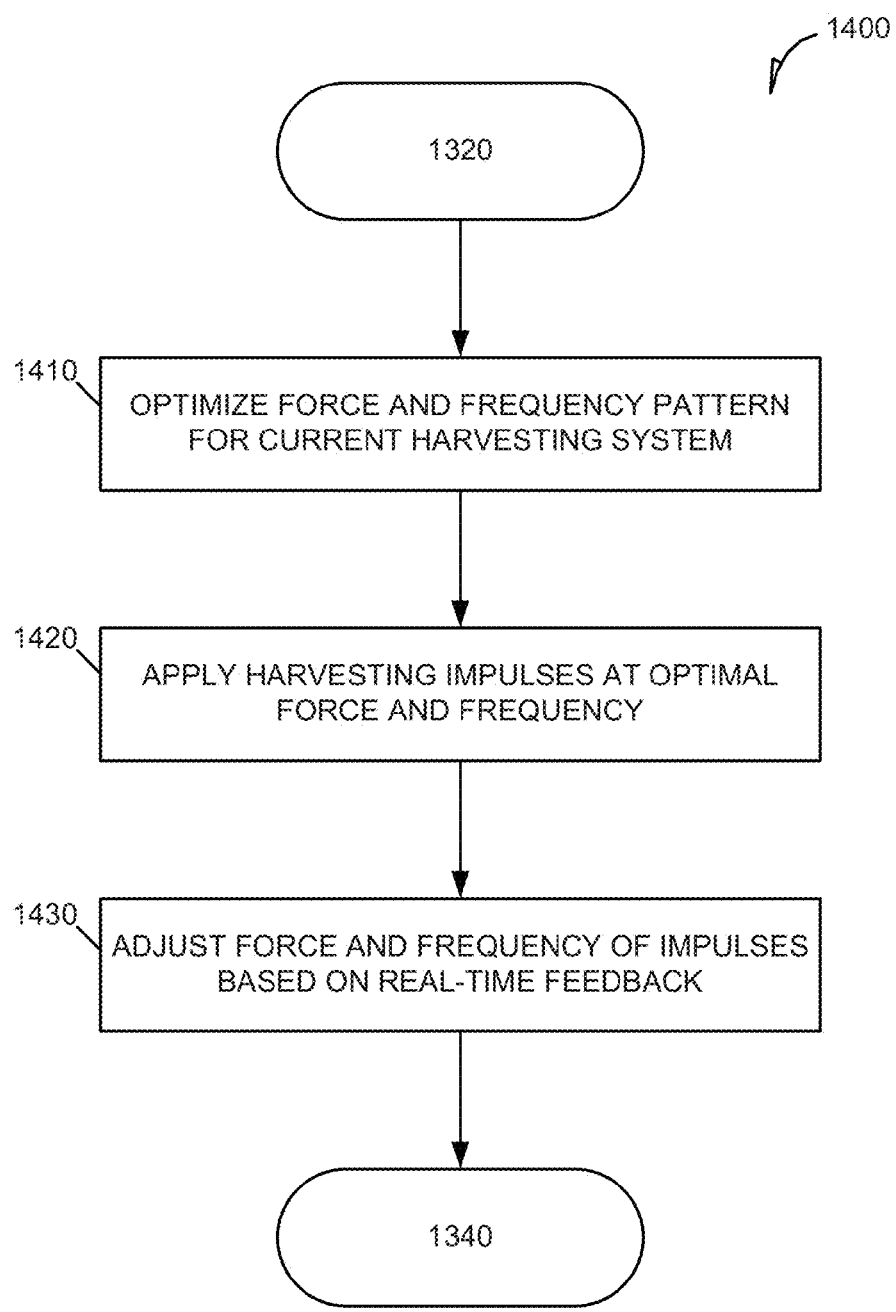
FIG. 14 is a flowchart illustrating an example method for optimizing the harvest of fruit or nuts using an advanced linear pulse tree shaker.

FIG. 14 is a flowchart illustrating an example method for optimizing the harvest of fruit or nuts using an advanced linear pulse tree shaker. In an example, a method 1400 can augment operation 1330 depicted in FIG. 13. The method 1400 includes optimizing force and frequency patterns for current harvesting system at 1410, applying harvesting impulses at optimal force and frequency at 1420, and adjusting force and frequency of impulses based on real-time feedback at 1430. The method 1400 begins at 1410 with the control system 130 optimizing force and frequency patterns according to the characteristics of the current harvesting system. In certain examples, the control system 130 mathematically derives the harvesting system's natural frequency, damping coefficients, spring constant, and system mass from the collected data. The control system 130 can use the collected and derived information to optimize the force and frequency to be applied to each individual harvest target.

At 1420, the method 1400 continues with the MLA 210 applying harvesting impulses at the optimal force and frequency pattern derived at operation 1410. As the fruit or nuts are dislodged from the harvest target, the dynamic characteristics of the harvesting system change. Thus, the method 1400 continues at 1430 with the control system 130 adjusting force and frequency of impulses based on real-time feedback. Adjustment of force and frequency can continue until harvesting is terminated.

Production Mapping

The ALPTS system 100 can map production for each individual tree harvested by analyzing the mass before, during, and after the harvesting process. The individual tree production data can be sent over a wide-area network 140 to a master production planning system or maintained locally on the control system 130. Product reports can be generated for an entire orchard or broken down into regions. Mapping production data can provide valuable feedback to the grower regarding watering, fertilizer, and other crop management procedures. The mapping data can allow the grower to minimize costly inputs by more selectively applying necessary resources (e.g., chemicals or irrigation).

The product mapping can be further enhanced with the incorporation of global positioning system data to create a fully automated production map.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown and described. However, the present inventors also contemplate examples in which only those elements shown and described are provided.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description.

The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A system comprising:
an electro-mechanical shaker head configured to dislodge fruit or nuts from a target tree using a linear energy system;
a transport mechanism used to position the electro-mechanical shaker head on the target tree; and
a control system communicatively coupled to the shaker head and configured to dynamically control shaker head operation to automatically initiate and maintain a shaking operation approximating a natural frequency of a combination of the electro-mechanical shaker head and at least a portion of the target tree, wherein a mass of the portion of the target tree changes over time.

2. The system of claim 1, wherein the linear energy system includes a magnetostrictive linear actuator.

3. The system of claim 1, wherein the electro-mechanical shaker head includes a clamping system to secure the electro-mechanical shaker head to the target tree.

4. The system of claim 3, wherein the clamping system includes a plurality of spring loaded clamping arms.

5. The system of claim 1, wherein the transport mechanism is configured to mechanically disconnect from the electro-mechanical shaker head prior to harvesting.

6. The system of claim 1, wherein the control system is configured to control the application of force by the linear energy system based on real-time feedback received from the electro-mechanical shaker head.

7. An apparatus comprising:
a clamping system including at least two clamping arms configured to secure the apparatus to a tree trunk or scaffold limb of a target tree;
a linear energy system mounted on a clamping arm and positioned to align with the centerline of the tree trunk or scaffold limb, the linear energy system configured to deliver force impulses substantially perpendicular to the tree trunk or scaffold limb; and
a control system communicatively coupled to the linear energy system and configured to control the delivery of force impulses to automatically initiate and maintain a shaking operation approximating a natural frequency of a combination of the electro-mechanical shaker head and at least a portion of the target tree, wherein a mass of the portion of the target tree changes over time.

8. The apparatus of claim 7, wherein the clamping system includes a mechanical spring mechanism integrated into the clamping arms to secure the apparatus to the tree trunk or scaffold limb.

9. The apparatus of claim 7, wherein the clamping system includes a hydraulic mechanism to secure the apparatus to the tree trunk or scaffold limb.

10. The apparatus of claim 7, wherein the linear energy system is a magnetostrictive linear actuator.

11. The apparatus of claim 7, wherein the control system is configured to vary impulse frequency and magnitude independently.

12. The apparatus of claim 7, further including an accelerometer configured to provide real-time feedback to the control system.

13. The apparatus of claim 12, wherein the control system is configured to control the force impulses delivered by the linear energy system based on the real-time feedback received from the accelerometer.

14. The apparatus of claim 7, wherein the control system is configured to control the force impulses delivered by the linear energy system by using the relationship between voltage and current to maintain a state of resonance.

15. A method comprising:
clamping an electro-mechanical tree shaker head onto a portion of a target tree;
harvesting produce secured to the target tree by delivering linear impulse forces with the electro-mechanical tree shaker head to the target tree, wherein the harvesting includes automatically controlling the electro-mechanical tree shaker head to initiate and maintain a shaking operation approximating a natural frequency of the combined system of the electro-mechanical tree shaker head and at least a portion of the target tree, wherein a mass of the portion of the target tree changes over time; and
dislodging produce.

16. The method of claim 15, wherein the clamping includes using a transport vehicle to position the electro-mechanical tree shaker head on the target tree.

17. The method of claim 15, wherein the harvesting includes using a magnetostrictive linear actuator to deliver the linear impulse forces.

18. The method of claim 15, wherein the harvesting includes controlling the electro-mechanical tree shaker head with a dynamic closed loop control system.

19. The method of claim 18, wherein the harvesting includes using the dynamic control system to produce at least one of the following pattern of forces:
unidirectional impulses;
bi-directional impulses;
sinusoidal impulses;
or any combination of arbitrary waveforms.

20. The method of claim 15, wherein the harvesting includes:
determining a pre-harvest mass of the target tree and the electro-mechanical tree shaker head;
determining a post-harvest mass of the target tree and the electro-mechanical tree shaker head; and
calculating a crop mass removed from the target tree during harvesting from the pre-harvest mass and the post-harvest mass.

21. The method of claim 15, wherein the harvesting includes applying alternating impulse forces to the target tree using the electro-mechanical tree shaker head.

22. The method of claim 21, wherein the harvesting includes applying intermittent non-alternating impulse forces to the target tree using the electro-mechanical tree shaker head.

* * * * *